C. A. BUCHHOLZ.
PROPELLING MECHANISM.
APPLICATION FILED MAR. 25, 1918.

1,276,168.

Patented Aug. 20, 1918.

WITNESSES

INVENTOR
Clarence A. Buchholz
BY
ATTORNEY

UNITED STATES PATENT OFFICE.

CLARENCE A. BUCHHOLZ, OF COLUMBUS, WISCONSIN.

PROPELLING MECHANISM.

1,276,168.  Specification of Letters Patent.  Patented Aug. 20, 1918.

Application filed March 25, 1918. Serial No. 224,586.

*To all whom it may concern:*

Be it known that I, CLARENCE A. BUCHHOLZ, a citizen of the United States, residing at Columbus, in the county of Columbia and State of Wisconsin, have invented certain new and useful Improvements in Propelling Mechanism, of which the following is a specification.

This invention relates to machine elements, and more especially to racks and pinions; and the object of the same is to produce a propelling mechanism for vehicles and the like, such as hand cars, baggage trucks, children's co-carts and the like wherein the propelling force is hand power applied to a swinging or rocking lever.

The object of the invention is to produce propelling mechanism of this character having no dead center and in which power from the lever is applied to the driving wheels with equal force in any position of the lever. Other objects are brought out in the construction which I have adopted, and the same is fully described in the following specification, reference being had to the drawings, wherein:—

Figure 1:
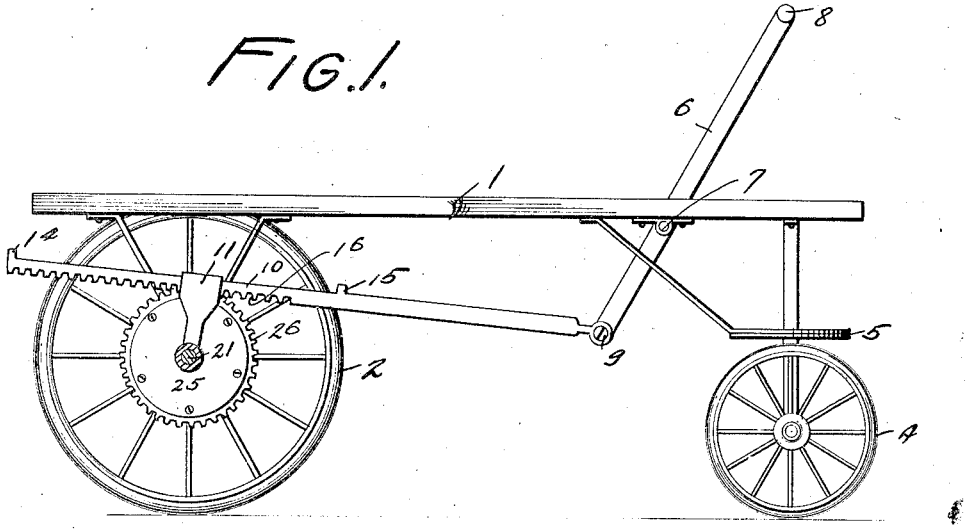
Figure 2:
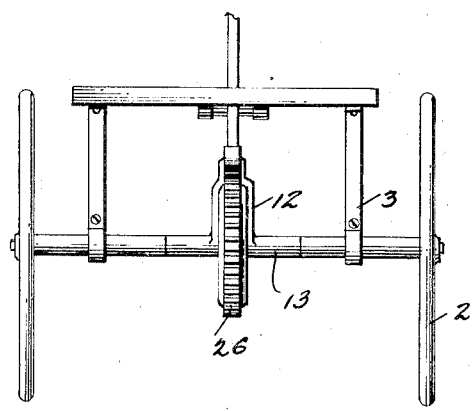
Figure 3:
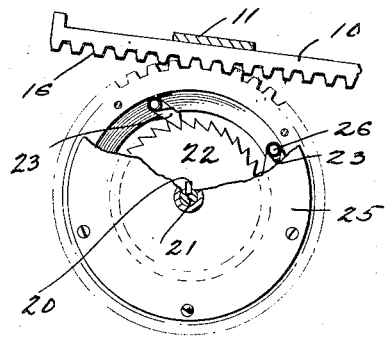

Figure 1 is a side elevation of a vehicle equipped with this propelling mechanism, Fig. 2 is a rear elevation, and Fig. 3 is an enlarged sectional detail of the drum, showing the pawls and ratchet therein.

The running gear of the vehicle illustrated herewith comprises a bed 1 mounted on rear or driving wheels 2 journaled in bearings 3 and the front or steering wheels 4 whose axle turns beneath a fifth wheel 5 so that steering may be done with the feet on the hubs or the axle, or by hand if suitable mechanism for that purpose is provided.

Power for propelling this vehicle is generated by the operator moving a lever 6, the same being pivoted between its ends at 7 within and extending preferably through a slot in the bed 1, and having handles 8 at its upper end to be gripped by the hands of the operator who may sit upon the bed in a manner not necessary to illustrate. To the lower end of the lever at 9 is pivoted a rack bar 10 whose rear portion extends slidably through a yoke 11 whose arms 12 have sleeves 13 which are mounted loosely on the rear axle in a manner shown in Fig. 2, and the rear extremity of the rack bar carries a stop 14 while another stop 15 may be provided forward of the teeth 16 to prevent the bar from disengaging the yoke.

Keyed at 20 to the rear axle 21 is a ratchet wheel 22 engaged by a number of pawls 23 which are mounted on spring pivots 24 within a drum 25 which is loose on the axle between the arms 12 of the yoke; and the periphery of this drum has teeth 26 meshing with those numbered 16 on the rack bar 10 as best seen in Fig. 3.

Now when the lever 6 is rocked on its pivot 7, the rack bar 10 is reciprocated through the yoke and oscillatory reciprocatory motion is given to the drum in a manner which will be clear. At each turning of the drum in Fig. 3 to the right, its pawls 23 engage the ratchet wheel 22 and give it a forward impulse so that the main axle 21 and wheels 2 are turned forward; and at each movement of the rack bar to the left the drum 25 is turned in a reverse direction and the pawls 23 slip idly over the teeth of the ratchet 22 whereas the latter is yet running forward under the inertia given by the first forward impulse of the rack bar. Thus the operator may swing the lever 6 to and fro, moving the rack bar rearwardly as rapidly as desired, and impelling it forwardly by pulling the rear on the handles 8 only at a speed proportionate to the progress of the vehicle; but it is quite obvious that no matter whether he takes long strokes or small ones, each pull of the handles to the rear imparts a forward impulse to the ratchet wheel and main axle, no matter what may be the point of starting. Thus the vehicle may be propelled along tracks or over the roadway with ease and at a speed commensurate with the power and rapidity of the strokes imparted to the lever. Further details will not be necessary.

What is claimed as new is:—

In a propelling mechanism for vehicles, the combination with a vehicle body mounted on a driving axle and main wheels, steering mechanism for said body, and a rock lever pivoted through the body; of a ratchet wheel keyed to the mid-length of said main axle, a drum loosely mounted on the axle and inclosing said wheel, a spring pawl mounted within the drum and engaging said ratchet, the periphery of the drum having teeth, sleeves loose on the axle at opposite sides of the drum, a yoke whose arms are connected with said sleeves, and a rack bar pivoted at one end to the lever and having its other end slidably mounted through said yoke and provided with teeth meshing with those on the drum, for the purpose set forth.

In testimony whereof I affix my signature in presence of two witnesses.

CLARENCE A. BUCHHOLZ.

Witnesses:
F. L. KEITH,
PAUL A. PAEPKE.